United States Patent [19]

Ng

[11] Patent Number: 5,991,825
[45] Date of Patent: Nov. 23, 1999

[54] SYSTEM FOR HANDLING MISSED REVOLUTION IN A DISK DRIVE BY ABORTING THE EXECUTION OF PRIMARY COMMAND AND EXECUTING SECONDARY COMMAND IF A MISSED REVOLUTION OCCURS

[75] Inventor: Spencer W. Ng, San Jose, Calif.

[73] Assignee: International Business Machines Corporation, Armonk, N.Y.

[21] Appl. No.: 08/891,572

[22] Filed: Jul. 11, 1997

[51] Int. Cl.$^6$ ..................................... G06F 13/14
[52] U.S. Cl. ................ 710/6; 710/39; 711/112; 711/167
[58] Field of Search .................... 395/829, 826, 395/827, 561, 670; 710/6, 39; 711/167, 112

[56] References Cited

U.S. PATENT DOCUMENTS

| | | | |
|---|---|---|---|
| 4,680,703 | 7/1987 | Kriz | 364/200 |
| 4,819,151 | 4/1989 | May | 364/200 |
| 5,018,063 | 5/1991 | Liu | 364/200 |
| 5,220,653 | 6/1993 | Miro | 395/275 |
| 5,408,367 | 4/1995 | Emo | 360/53 |
| 5,426,736 | 6/1995 | Guineau, III | 395/250 |
| 5,428,787 | 6/1995 | Pineau | 395/700 |
| 5,428,802 | 6/1995 | Anglin et al. | 395/800 |
| 5,455,924 | 10/1995 | Shenoy et al. | 395/455 |
| 5,570,332 | 10/1996 | Heath et al. | 369/50 |
| 5,627,976 | 5/1997 | McFarland et al. | 395/308 |
| 5,729,718 | 3/1998 | Au | 395/494 |
| 5,796,992 | 8/1998 | Reif et al. | 395/555 |
| 5,828,836 | 10/1998 | Westwick et al. | 395/200.3 |

OTHER PUBLICATIONS

M. Seltzer et al., "Disk Scheduling Revisited", USENIX—Winter '90.

B. L. Worthington et al., "Scheduling Algorithms for Modern Disk Drives", Sigmetrics 94–May 1994, Santa Clara. CA.

G. Humphrey, "High Performance PCs Use SCCI", Computer Technology Review, Nov. 1996.

*Primary Examiner*—Thomas C. Lee
*Assistant Examiner*—Zlwoo Park
*Attorney, Agent, or Firm*—Khanh Q. Tran

[57] ABSTRACT

A method and disk controller for handling missed revolutions in a disk drive having a rotating data media are disclosed. The method is based on a Rotational Positioning Optimization (RPO) algorithm and comprises the steps of: selecting a primary and a secondary command from the queue using the RPO while a current command is being executed; executing the primary command after the current command is completed; if a missed revolution occurs, then aborting the execution of the primary command and executing the secondary command; and repeating the method steps until all the commands in the queue are executed. Preferably, the RPO algorithm is based on a profile of estimated seek times for the commands in the I/O command queue. The method uses a generally aggressive seek time estimate in selecting a primary command and a generally conservative estimate is used for selecting a secondary command. Accordingly, the missed revolutions can be avoided and system performance is improved.

20 Claims, 5 Drawing Sheets

|  | Tag | Operation | Start Address | No. of Blocks |
|---|---|---|---|---|
| 1st command | Host 2; #165 | Read | 102 | 2 |
| 2nd command | Host 1; #372 | Read | 7893 | 8 |
| 3rd command | Host 1; #373 | Write | 484731 | 32 |
| 4th command | Host 2; #166 | Write | 222308 | 2 |
| 5th command | Host 1; #374 | Read | 108 | 16 |
| 6th command | Host 2; #167 | Read | 379762 | 64 |
| 7th command | Host 1; #375 | Write | 3389 | 3 |
| 8th command | Host 2; #168 | Read | 379826 | 64 |

SYSTEM FOR HANDLING MISSED REVOLUTION IN A DISK DRIVE BY ABORTING THE EXECUTION OF PRIMARY COMMAND AND EXECUTING SECONDARY COMMAND IF A MISSED REVOLUTION OCCURS

FIELD OF THE INVENTION

The present invention relates to data storage systems, and in particular to a method and system for handling missed revolutions in a disk drive having a rotating data media, in which I/O commands are selected to be processed based on a Rotational Positioning Optimization algorithm.

BACKGROUND OF THE INVENTION

Disk drives are information storage systems that use at least one rotatable disk with concentric data tracks containing the information, a transducer (or head) for reading data from or writing data to the various tracks, and a transducer positioning actuator connected to the transducer for moving it to the desired track and maintaining it over the track during read and write operations. The transducer is attached to a slider, such as an air-bearing slider, which is supported adjacent to the data surface of the disk by a cushion of air generated by the rotated disk. The slider is mounted on a support arm of the transducer-positioning actuator by means of a suspension. The suspension provides dimensional stability between the slider and the actuator arm, controlled flexibility in pitch and roll motion of the slider relative to its direction of motion on the rotating disk, and resistance to yaw motion.

FIG. 1 illustrates in sectional view a schematic of a prior art disk drive. The disk drive comprises a base 1 to which are secured a disk drive motor 4 and an actuator 5, and a cover 2. Typically, there is a gasket 3 located between base 1 and cover 2 and a small breather port (not shown) for equalizing pressure between the interior of the disk drive and the outside environment. A magnetic recording disk 6 is connected to drive motor 4 by means of hub 7 to which it is attached for rotation by the drive motor 4. Magnetic recording disk 6 has a data surface 8 for data to be written to and read from. A read/write head or transducer 9 is formed on the trailing end of a carrier, such as a slider 10. The slider 10 is attached to the actuator 5 by means of a rigid support arm 11 and a flexible suspension 12. The suspension 12 provides a biasing force which urges the slider 10 onto the data surface 8 of the recording disk 6. It should be apparent that a disk storage system may contain multiple disks 6, actuators 5, and suspensions 12. Each actuator 5 may support a number of sliders 10, where each slider 10 may have more than one read/write head 9.

FIG. 2 illustrates a disk surface 8 containing a plurality of concentric data tracks 13 (1 to T+1). Data is written to and read from the tracks 13 in storage units referred to as sectors. Each sector 14 commonly holds 512 bytes of data plus header and trailer information, such as error correction data. In operation, the transducer 9 typically reads several data sectors from the disk surface 8 (or writes several data sectors to the disk surface) in response to an input/output (I/O) command sent by a host computer connected to the disk system.

FIG. 3 depicts the functional block diagram of a representative computer-disk configuration in which a drive 15 is electronically attached to a host computer 16 via a disk controller 17. The disk controller 17 mainly provides a standard communication interface between the computer 16 and various types of disk drives, and necessary error correction for the data transferred between the computer 16 and drive 15. Physically, the controller 17 may be implemented as part of the drive 15 (e.g., an IDE-interface hard disk for PCs) or as a separate unit (e.g., an SCSI-interface disk drive adapter card for PCs). Also, the drive 15 typically includes the necessary electronics 18 to interface with the drive controller 17 and to control the operation of the read/write head 9. In other configurations, a computer 16 may be connected to many controllers 17 and a controller 17 may be attached to several drives 15. Alternatively, several computers 16 may access a single drive 15 via a controller 17.

Before data can be written to or read from the disk surface 8, the actuator 5 must first move the support arm 11 so that the read/write head 9 is over the recording track 13 containing the first sector requested by the command. The elapsed time for this mechanical repositioning of the head is referred to as the seek time. Once the read/write head 9 is positioned over the appropriate track, it must then wait for the first sector requested by the command to rotate under it in order for the writing or reading of data to commence. The elapsed time for this rotation is referred to as the rotational latency time.

Both the seek time and rotational latency time are mechanical delay times. The total mechanical delay time before any data transfer can take place is the sum of the seek time and the rotational latency time. The shorter this total mechanical delay time, the faster the disk system can complete the I/O command.

The disk controller 17 typically maintains a queue of I/O commands to be performed. Each I/O command contains the instruction for the disk drive to read or write the data to a particular position on the disk. An I/O command may be tagged, i.e., it carries a label or a number which allows it to be uniquely identified. If the I/O commands are tagged, then they can be serviced (or executed) by the system out-of-order, i.e., they do not have to be serviced in the order that they arrive at the disk drive.

An example of a tagged command queue is shown in FIG. 4. In this example, the disk drive can be accessed from two different host computers, namely, Host 1 and Host 2. The tag associated with each command identifies the host that makes the request and a unique sequence number. Each I/O command consists of the operation type (Read or Write), a starting block address, and the size of the command in number of blocks.

Since the I/O commands from the host computers are tagged in the command queue, they do not have to be serviced in the order that they arrive at the disk drive. This flexibility in scheduling allows the commands to be serviced in an order in which the mechanical delay time can be opportunistically reduced. From FIG. 4, it is apparent that it is very advantageous to schedule the 8th command to be serviced immediately after the 6th command because the starting address for the 8th command is immediately after the last block read by the 6th command (at address 379825).

Prior art algorithms for reducing mechanical delay time were mainly aimed at reducing the seek time, such as the one referred to as the shortest seek algorithm. This algorithm examines all the commands in the queue and selects the command with the shortest seek distance (and, hence, the shortest seek time), in either direction, from the ending position of the current command to be the next command to be serviced. Another algorithm, referred to as the elevator algorithm, sweeps the head of the disk from the outside diameter of the disk towards the inside diameter of the disk, stopping to service any I/O command that it encounters along the way. When the head reaches the inside diameter of the disk, it reverses direction to sweep outward, again stopping to service any I/O command that it encounters along the way. A variation of the elevator algorithm is the, C-Look algorithm, where the disk drive stops to service I/O commands only during one direction of sweep. Although these algorithms are relatively simple to implement, they may not result in the smallest total mechanical delay time because the seek time is only one of two components of the total mechanical delay time, as described above. A command with a short seek time may have a very long rotational latency time and, hence, a long mechanical delay time.

More recent algorithms are designed to reduce the total mechanical delay time, such as the Rotational Positioning Optimization (RPO) algorithms. RPO algorithms are typically more complex than the seek scheduling algorithms and will be described in detail below in the preferred embodiment. In general, an RPO algorithm operates by having the drive controller maintain a simple model of the seek profile of the drive, which is then used to estimate the mechanical access time for each command in the queue. The controller then selects the command with the smallest estimated access time to be the one to be serviced next. In the ideal case, the drive's actual servo should perform consistently very close to the model. However, in reality, due to a variety of different reasons, there is always some variation in the actual seek time (some drive designs may exhibit more variance, some may have less), making it impossible to accurately predict the seek time 100% of the time. If the actual seek time turns out to be longer than what is estimated, it is possible that by the time the head arrives at the target track, the target sector may have just gone by. The drive then must wait for one disk revolution before it can read the target sector. This situation is commonly referred to as a "missed-revolution", which degrades the performance of the disk system.

One solution for avoiding missed-revolutions is to adopt a more conservative model of the seek profile, so that longer seek times are estimated. Conceivably, when a high enough seek time estimate is used, it is possible to avoid the missed-revolution situation completely. However, this has the net effect of increasing the average service time because the algorithm will now miss out on selecting the optimum command to service much of the time (i.e., the command with the target sector closest to the head's current position without a missed revolution). Thus, such an approach reduces the effectiveness of the RPO algorithm.

Accordingly, there remains a need for a method and apparatus for handling missed revolutions in data storage systems without the above-described disadvantages.

SUMMARY OF THE INVENTION

It is an object of the present invention to provide a method and system for handling missed revolutions in a data storage system so that the system performance is not degraded when a read/write head misses a target position on a rotating media.

It is another object of the present invention to provide a method and system for handling missed revolutions in a storage system in which a Rotational Positioning Optimization algorithm is used for optimizing the selection of I/O commands from a command queue to be processed.

To achieve these and other objects, the present invention provides a method for handling missed revolutions in a disk drive comprising the steps of: (i) selecting a primary command from an I/O command queue using a Rotational Positioning Optimization (RPO) while a current command is being executed, the RPO being based on a profile of estimated seek times for the commands in the queue; (ii) selecting a secondary command from the queue using the same optimization; (iii) executing the primary command after the current command is completed; (iv) if a missed revolution occurs during the execution of the primary command, then aborting the execution of the primary command and executing the secondary command; and (v) repeating the method steps until all the commands in the queue are executed.

In accordance with the invention, the step of aborting the primary command includes returning this command to the command queue so that it will be selected again for execution. Preferably, the aborted command is returned to the command queue while the secondary command is being processed for improved performance. Also, if there is no other command in the queue, the method will continue with the execution of the primary command in spite of the missed-revolution condition.

Each I/O command to a disk drive corresponds to a starting position and an ending position of the read/write head relative to the disk surface. In the preferred embodiment of the invention, the Rotational Positioning Optimization includes, for each command in the queue, an estimated total time for the head to be repositioned from a reference position (relative to the disk) to the starting position of the command. Alternatively, the total delay time is estimated only for each of the first N commands in the queue (where N is a predetermined factor) to reduce the overhead and computational complexity of the optimization algorithm.

The ending position of the current command is preferably used as the reference point for the commands remaining in the queue. In general, the commands selected from the queue for execution next are those with the shortest estimated total time. The primary command is preferably chosen using an aggressive seek profile for the drive, with the ending position of the current command being its reference point. On the other hand, the secondary command is preferably chosen using a conservative seek profile, with the starting position of the primary command plus M sectors being its reference point, where M is a predetermined factor. Further details on aggressive and conservative seek profiles for a disk drive will be described later in the preferred embodiment section. Because of the conservative time estimate for the alternate command, it is unlikely that this command will also result in a missed revolution.

In a typical disk drive, the total mechanical delay time (i.e., the time it takes for the read/write head to move from its current position to a target location on the disk) includes a seek time and a rotational latency time. The seek time is the time it takes for the head to move from its current position to the track containing the first target sector, while the rotational latency time corresponds the time it takes for the disk to rotate so the target sector is adjacent the head. Accordingly, the estimated total time for each command preferably includes the seek time and rotational latency time for the starting position of the command. Furthermore, in the case where the estimated total mechanical delay time of the secondary command is longer than the rotational latency time of the primary command, it is not necessary to abort the execution of the primary command. This is so because the primary command can still be completed in a shorter time than the secondary command, even with the missed revolution condition.

In another aspect of the invention, a disk controller for use with a disk drive and for handling missed revolutions in the disk drive is also disclosed. The controller includes electronic circuits, software, microcode, or a combination thereof to implement the method steps of the invention as described in detailed in the preferred embodiment.

Additional objects and advantages of the present invention will be set forth in the description which follows, and in part will be obvious from the description and with the accompanying drawing, or may be learned from the practice of this invention.

DESCRIPTION OF THE PREFERRED EMBODIMENT

Figure 1:
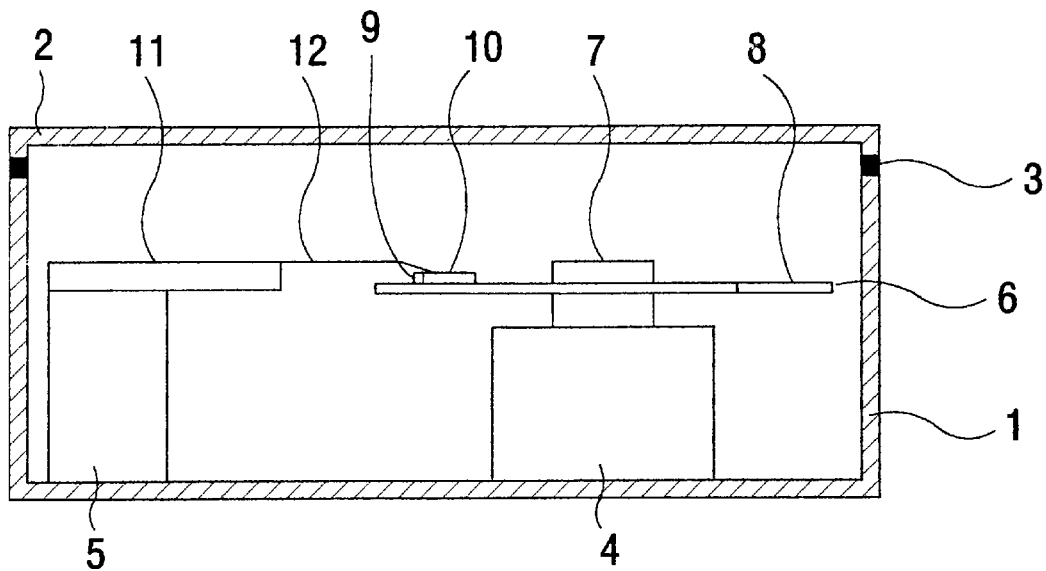
FIG. 1 is a simplified block diagram of a prior art magnetic recording disk drive for use with the controller and method for handling missed revolutions according to the present invention.
Figure 2:
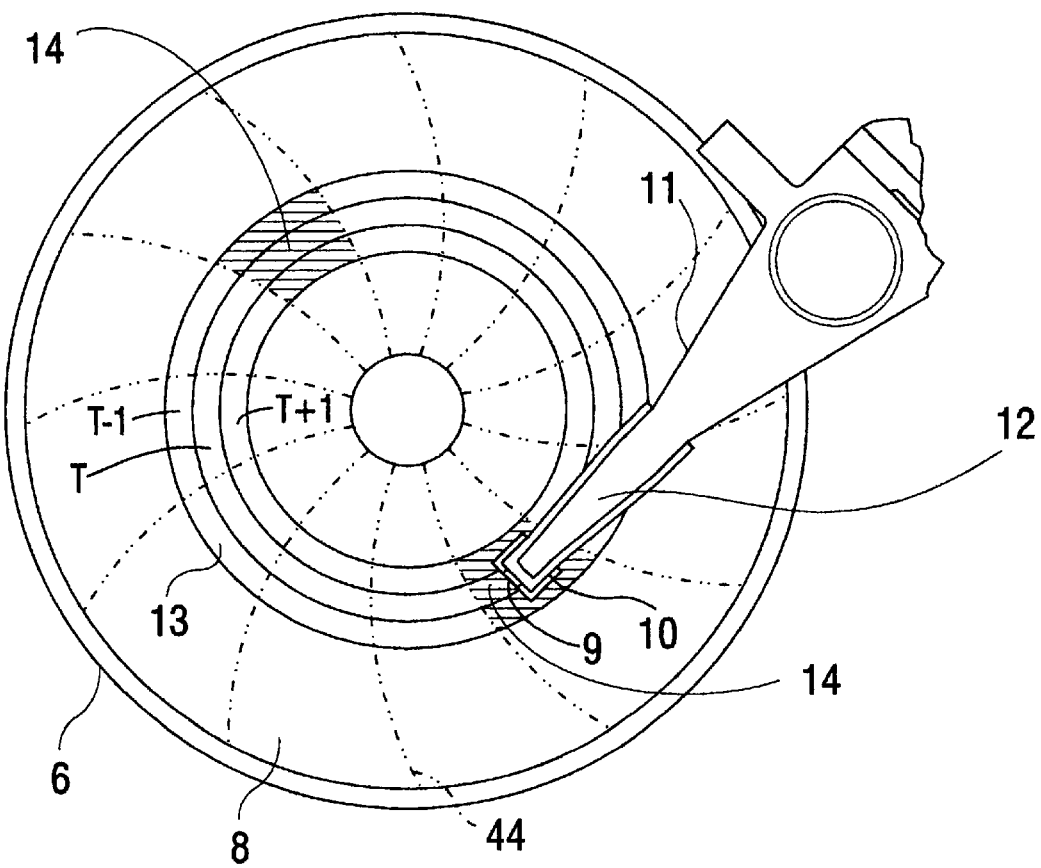
FIG. 2 illustrates a disk surface of the disk drive in FIG. 1, with a typical layout of the data stored on the disk surface.
Figures 3, 4:
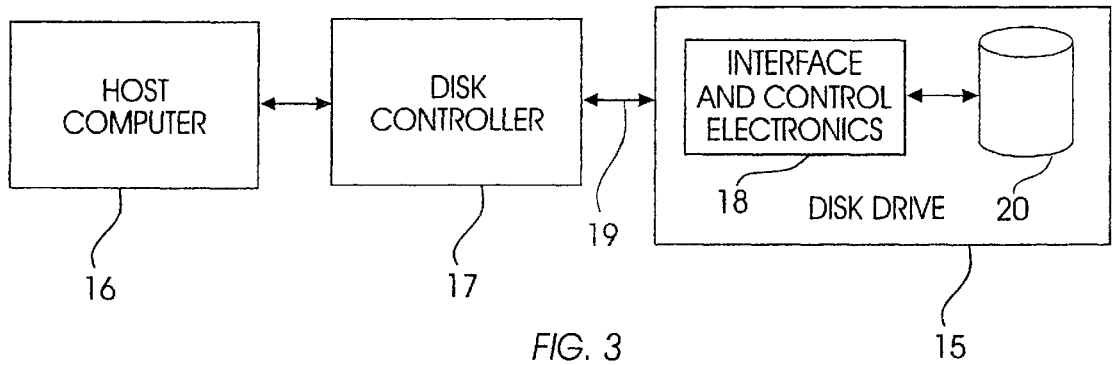
FIG. 3 is a block diagram of a representative computer-disk configuration in which the disk drive is electronically attached to a host computer via a disk controller.
FIG. 4 illustrates an example of a tagged I/O command queue to be processed by the disk controller of FIG. 3, through which two host computers can access an attached disk drive.

For purposes of illustration only, and not to limit generality, the present invention will now be described with reference to its use in a disk drive system. However, one skilled in the art will recognize that the method and apparatus of the present invention may be used in other data storage systems having rotating data media, such as CD-ROM drives, Digital Video Disk (DVD) drives, and optical disk drives.

The present invention provides a method and system for handling missed revolutions in a disk drive having rotating data media, using a Rotational Positioning (RPO) algorithm to select the next I/O requests to the drive for service. An RPO is an optimization in the scheduling of pending I/O commands to the disk drive, by reducing the total mechanical delay time associated with each command based on a model of the drive's seek characteristics. Further details on a typical RPO algorithm are described below. Using the RPO algorithm, the method optimally selects from the command queue, in advance of the execution of every primary command, an alternate command. The alternate command would be processed if the primary command is aborted due to a missed revolution occurring during the execution of the primary command. The pre-selection and execution of the alternate command increase the chance that another target sector can be accessed without delay due the missed revolution, thus improving the overall throughput of the disk system. Such a performance improvement is achieved because in the case of a missed revolution, the read/write head would have barely missed the sector targeted for the primary command. Thus, by executing the alternate command, the delay time due to another revolution of the media (so that the head can be repositioned at the primary target sector) can be avoided.

An example of the RPO algorithms typically used in disk drives is now described. First, some common technical terms relating to disk drives are defined. In a given disk drive, a data location on the surface of a disk is usually characterized by three components: a cylinder number which represents the radial position of the data, a head number which indicates the disk surface containing the data, and an angular position of the data. A cylinder is a set of data tracks on the disk surfaces that have the same radius. The cylinder number identifies the cylinder on which the data resides. The angular position is defined by the sector number (minus 1) divided by the number of sectors per track. Associated with each I/O command is a start position and an end position. These two positions need to be determined only once by the disk controller at the time the command arrives and are saved with the other parameters of that command.

The estimated access time (EAT) of a command B relative to another command A is defined as the estimated mechanical time to go from the end position of command A to the start position of command B. It can be calculated with this simple loop:

ST=seek time from the end position of A to the start position of B;

EAT=revolution time x (start angular position of B -end angular position of A);

```
do while (EAT < ST){
    EAT = EAT + revolution time;
}
```

The main objective of an RPO algorithm is to search the queue for a command having the smallest EAT with respect to the command being executed (the current command). This command is then selected as the one to be executed after the current command is completed. Note that a non-empty queue always implies that there is one command in progress. Typically, the RPO algorithm operates as follows.

1. For each command that arrives at I/O command queue, the algorithm calculates and saves the starting and ending positions of the command.

2. If a command arrives to an idle disk drive, the execution of this command starts immediately. The command thus becomes the current command.

3. If a command arrives to a disk drive with another command already in progress but no other command in the queue, a next command pointer is set to point to the newly arriving command, which also becomes the next command to be processed after the current command is finished. The algorithm also computes and saves the estimated access time (EAT) for this next command relative to the current command.

4. If a command arrives to a disk drive and the I/O command queue is non-empty, the RPO algorithm computes the estimated access time for the arriving command relative to the current command ($EAT_{arrive}$). The time $EAT_{arrive}$ is then compared with the saved estimated access time for the next command ($EAT_{next}$), i. if $EAT_{arrive}$ is greater than $EAT_{next}$, nothing more needs to be done, ii. if $EAT_{arrive}$ is smaller than or equal to $EAT_{next}$, the next command pointer is set to point to this newly arriving command. Its estimated access time ($EAT_{arrive}$) is also saved. This new command now becomes the next command.

5. When the current command is completed, the next command is processed, which now becomes the new current command. The algorithm also treats all the remaining commands in the queue as if they are new arrivals and i. processes the first command in the queue according to step 3,
  ii. for each additional command in queue,
    a. processes this command according to step 4, and
    b. terminates the (5.ii) loop if the new current command is completed before the loop is done. This condition rarely occurs because the loop is usually completed very quickly before the current command is finished.

The disk controller implementing an RPO algorithm typically maintains a simple model of the seek profile of the disk drive which it uses to estimate the mechanical access time for each command in the queue. To reduce the overhead and computational complexity of the optimization algorithm, it may be more advantageous to estimate the access time only for each of the first N commands in the queue, rather than for every command. The drive controller selects from the I/O queue a command with the smallest estimated time to be the one to service next. In the ideal case, the drive's actual servo should perform consistently very close to the model. However, in reality, due to a variety of different reasons, there is always some variation in the actual seek time that makes it impossible to accurately predict the seek time 100% of the time. Some drive designs may exhibit more variance, some may have less. If the actual seek time turns out to be longer than what is estimated, it is possible that by the time the head arrives at the target track, the target sector may have just gone by. The disk drive must then wait for another disk revolution before it can read the target sector, resulting in a missed-revolution situation.

Figure 5:
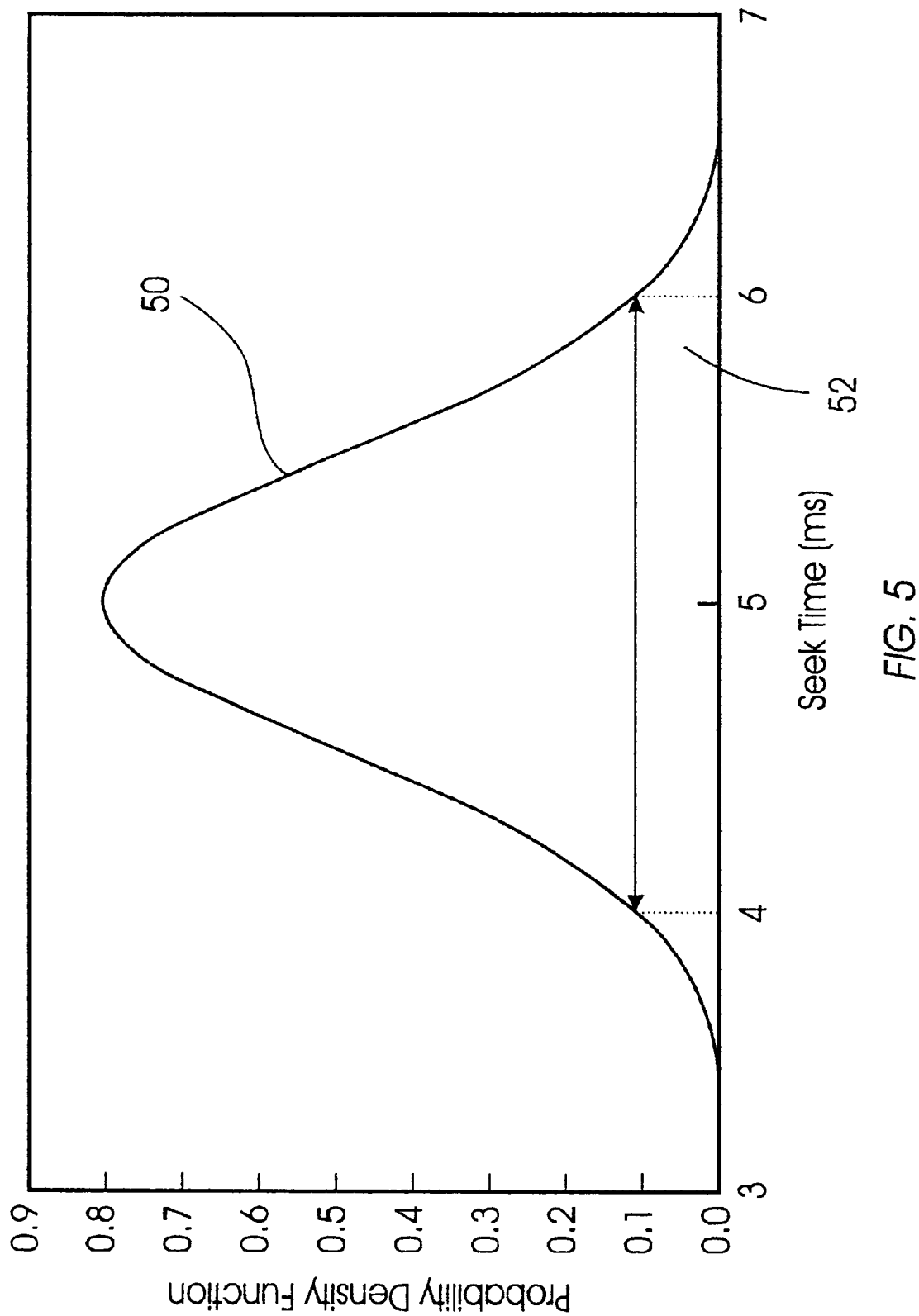
FIG. 5 shows an example of the probability density function of the seek time for a disk drive whose variance has a normal distribution.

For example, consider the time it takes for the drive to seek a distance of, say, 10 cylinders, i.e., to move the actuator from its current position to one that is 10 cylinders away. In one million trials, the average time may be, say, 5 msec. However, many trials actually took less than 5 msec while many others actually took longer than 5 msec. As an example, FIG. 5 depicts the probability density function of this seek time for a disk drive whose variance has a normal distribution. The interpretation of the density function is that the probability of a seek completing within the time between two points on the curve 50 is the area under the curve 50. For example, in FIG. 5, the probability that the seek is completed between 4 and 6 msec is 95.45% (which corresponds to area 52 ); the average seek time is 5 msec. Using such a distribution function for the seek time, a seek profile for a particular drive may be modeled and used in the method of the invention, as described below.

Figure 6:
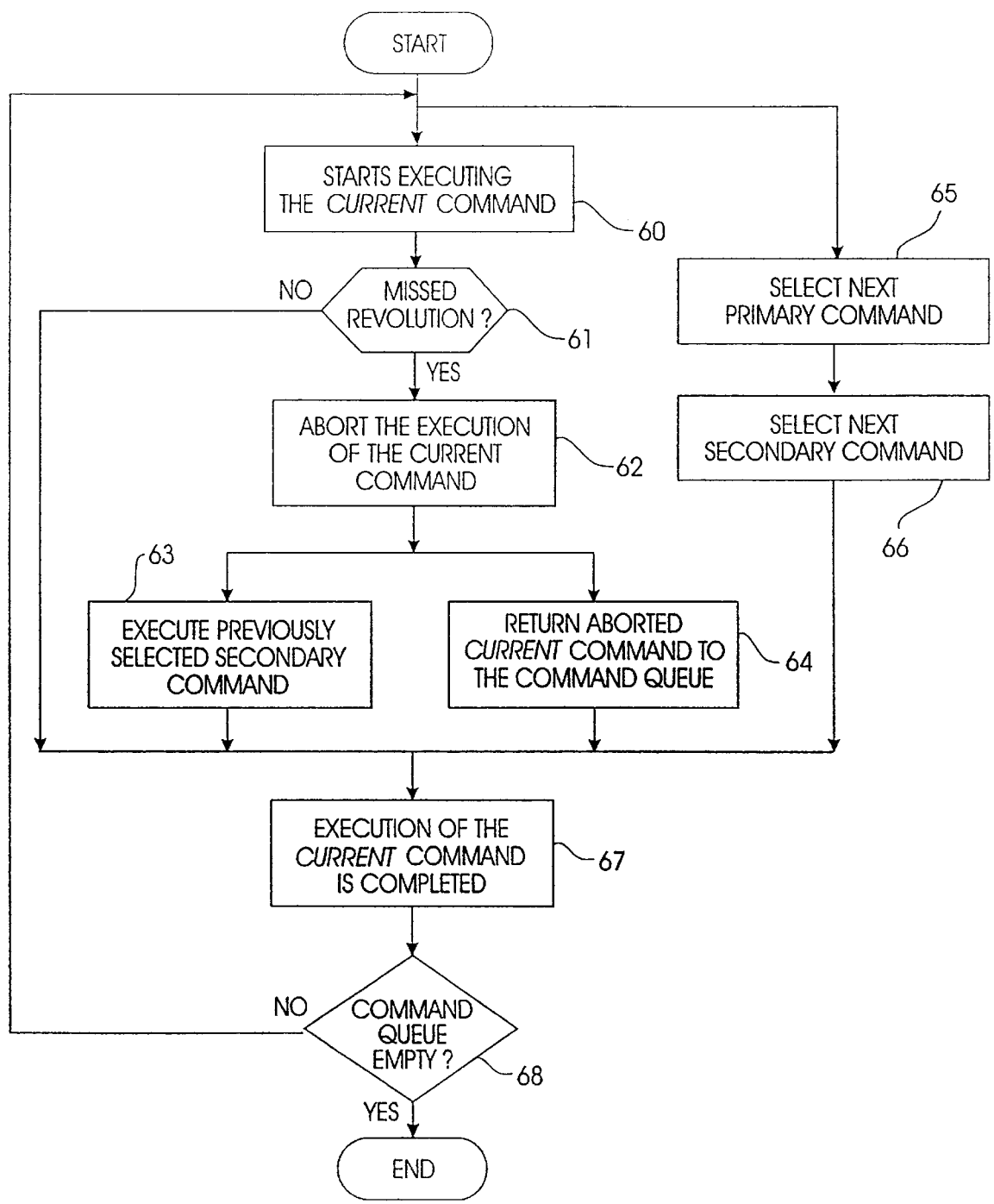
FIG. 6 is a high-level flow chart showing the general operation of the method for handling missed revolutions in a disk drive, in accordance with the present invention.

FIG. 6 is a flow chart representing the basic steps of the method for handling missed revolutions in a disk drive in accordance with the invention. Beginning with block 60, the method starts executing a command previously selected from the queue of pending I/O commands. This command is called the current command in the present execution cycle. While the current command is being performed, a primary command and a secondary command are selected from the I/O command queue using a predetermined RPO algorithm, as shown by blocks 65 and 66 respectively. The selected primary command preferably is the next optimum command to be performed, considering the ending position of the current command as a reference point. In addition, the RPO algorithm preferably uses a reasonably aggressive seek profile for the disk drive to select the primary command, and a reasonably conservative seek profile to select the secondary command.

Figure 7:
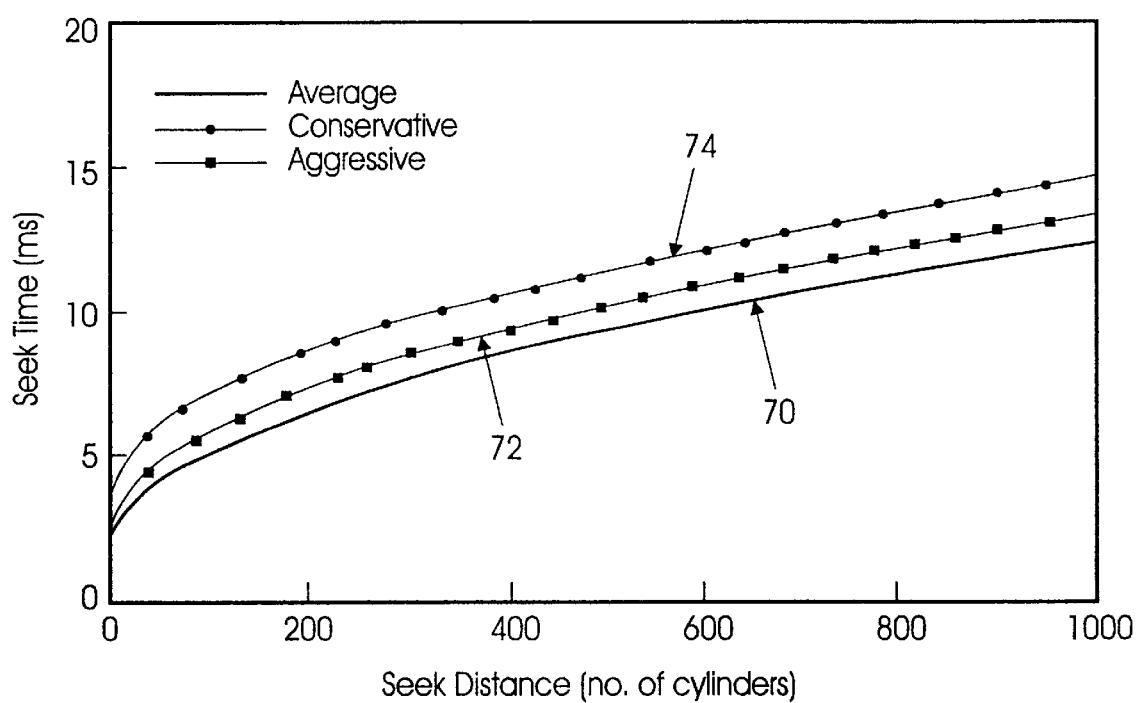
FIG. 7 shows an example of the seek profiles (the seek times for different seek distances) for a disk drive.

As an example, FIG. 7 is a graph representing the seek profile of an example disk drive, which shows the seek time for different seek distances. The average seek time, as explained above, is plotted against the seek distance as curve 70. Roughly half of the seeks will exceed the average seek time. An aggressive seek profile is one such that most (say, 90%) seeks will be completed in the time indicated by the profile (as illustrated by curve 72 in FIG. 7). A conservative seek profile is one such that all (100%) seeks will definitely be completed in the time indicated in the profile (as indicated by curve 74 in FIG. 7). For a given seek distance, the conservative seek time is longer than the aggressive seek time.

Referring again to FIG. 6, in block 61, the method determines whether a missed revolution occurs while the current command is being processed. If so, the execution of the current command is aborted in block 62. The execution of the previously selected secondary command, which now becomes the current command in the present execution cycle, is started in block 63. In the preferred embodiment of the invention, the aborted current command (i.e., the primary command selected in the immediately preceding execution cycle) is also returned to the I/O command queue while the secondary command is being performed, as shown by block 64. The aborted command then can be selected again to be serviced in the future. Note that in step 62, the current command needs not be aborted if there is no other command in the I/O queue. That is, the execution of the current command continues although the read/write head has missed the sector targeted in the current command. At block 67, the execution of the current command is completed (whether it is the previously selected primary or secondary command). The I/O command queue is then checked in block 68 to see if there are still pending commands in the queue. The steps of FIG. 6 are then repeated for any remaining commands in the queue.

In the preferred embodiment of the invention, the secondary (alternate) command is selected using the same RPO algorithm that was used to select the primary command, with the reference point being the starting position of the selected primary command plus N sectors. The factor N represents the maximum number of sectors likely to be missed by the read/write head if a missed-revolution situation occurs. In order to avoid the likelihood of a missed revolution for the secondary command, a generally conservative (long) estimation of the drive's seek time is preferably used for selecting this command.

In addition, the implementation of the step of detecting a missed revolution (step 61 in FIG. 6) typically depends on the specific architecture of this disk drive. For instance, when the drive's servo has completed a seek, the angular position of the target sector can be compared with the current angular position. If the angular position of the target sector is more than, say, 80% of a revolution from the current angular position, then a missed-revolution situation probably exists (unless such a long latency is expected by the controller as when the command is the only one in the queue).

Because a very conservative estimate was used in step 66 to select the alternate (secondary) command, its execution in step 63 should not normally result in a missed-revolution situation. In the unlikely event of missed-revolution while the secondary command is being processed, there are two alternatives:

a. repeat the method steps starting with step 61 and continue with yet another alternate target command; or
  b. continue with the secondary command by taking the missed-revolution to avoid possible thrashing. Thrashing is a condition in which the disk controller spends more time selecting commands to be executed rather actually executing the commands, thus degrading its performance.

As an example of the performance improvement resulting from the method of the invention, consider a benchmark program that sends 16 I/O commands to a disk drive to read 2-Kbyte blocks randomly within 100 Mbytes of data. The program keeps track of the total completion time for the 16 reads and computes the number of I/O operations per second. Assume that the drive has the following characteristics:

5400 rpm (i.e., 11.1 msec per revolution), 3 msec average seek within the 100-Mbyte data range, and 1.9 msec overhead and data transfer time for each 2-Kbyte block.

Without the benefit of an RPO, the average service time for each read operation is 3+5.55+1.9=10.35 msec, yielding a throughput of only 95.7 I/O operations per second. With an RPO, a simple analytical model will show that the average service time will decrease to 6.594 msec, producing a throughput of 151.6 I/O operations per second. If missed-revolutions happen in 5% of the time, then the analytical model will show that the average service time will increase from 6.594 msec to 7.115 msec, dropping the drive's throughput from 151.6 to 140.5 I/O operations per second.

A more conservative model of the seek profile (so that longer seek times are estimated) may be used to avoid the above missed-revolution situation. When a high enough seek time estimate is used, it is possible to avoid missed-revolution completely. However, this has the net effect of increasing the average service time because now the algorithm it will miss out on selecting the optimum command to service much of the time, i.e., the command with the closest target sector without a miss. Such an approach reduces the effectiveness of the RPO algorithm. For example, assume the following hypothetical probability of missed-revolution as a function of the seek time modeled for the above benchmark and drive:

| Average seek time estimate (msec): | 3.9 | 3.6 | 3.3 | 3.0 | 2.7 |
|---|---|---|---|---|---|
| Probability of miss-revolutions: | 0% | 1% | 2.5% | 5% | 10% |

Analytical modeling shows that the following average service times and throughputs are obtained:

| Average service time (msec): | 7.494 | 7.298 | 7.155 | 7.115 | 7.336 |
|---|---|---|---|---|---|
| I/O operations per second: | 133.4 | 137.0 | 139.8 | 140.5 | 136.3 |

It can be seen from the above data that while having many missed-revolutions is an undesirable situation, increasing the seek time estimate to avoid missed-revolutions completely can also end up reducing the overall performance of the disk drive. Thus one must carefully pick a tradeoff point between these two scenarios in order to optimize overall RPO performance. As an example, for the above benchmark program, it was shown that with a 5% probability of missed revolution, the average I/O command service time would be 7.115 msec, yielding a throughput of 140.5 I/O operations per second. Using the method of the invention as described above, with a maximum estimated average seek time of 3.9 msec for the selection of the secondary command, it was shown that the average service time is reduced to 6.860 msec, giving a throughput of 145.8 I/O operations per second. The results for the various seek-time versus miss-probability design points when the method for handling missed revolutions of the invention is used is summarized in Table 1.

TABLE 1

| Average seek time estimate (ms) | 3.9 | 3.6 | 3.3 | 3.0 | 2.7 |
|---|---|---|---|---|---|
| Probability of missed-revolutions | 0% | 1% | 2.5% | 5% | 10% |
| RPO WITHOUT THE INVENTION | | | | | |
| Average service time (ms) | 7.494 | 7.298 | 7.155 | 7.115 | 7.336 |
| I/O operations per second | 133.4 | 137.0 | 139.8 | 140.5 | 136.3 |
| RPO WITH THE INVENTION | | | | | |
| Average service time (ms) | 7.494 | 7.247 | 7.027 | 6.860 | 6.825 |
| I/O operations per second | 133.4 | 138.0 | 142.3 | 145.8 | 146.5 |

Table 1 illustrates that better performance for the disk drive can be derived from an RPO algorithm by using a more aggressive seek estimate (2.7 msec in the example) for selecting the primary target command, and applying the method of the invention to handle the increased missed-revolution situations.

A different workload was considered in which there were always 16 commands in the I/O command queue (i.e., a new command arrives as another one is being serviced). The performance numbers for this workload are summarized in Table 2.

As can be seen from Table 2 below, an increase in the seek time estimate in an RPO algorithm to minimize missed revolutions degrades the performance of the disk drive. However, when a reasonably aggressive primary target seek estimate is combined with the method of the invention, the drive performance is improved while missed revolutions in the drive can be simultaneously avoided.

TABLE 2

| Average seek time estimate (ms) | 3.9 | 3.6 | 3.3 | 3.0 | 2.7 |
|---|---|---|---|---|---|
| Probability of missed-revolutions | 0% | 1% | 2.5% | 5% | 10% |
| RPO WITHOUT THE INVENTION | | | | | |
| Average service time (ms) | 6.454 | 6.265 | 6.131 | 6.109 | 6.365 |
| I/O operations per second | 155.0 | 159.6 | 163.1 | 163.7 | 157.1 |
| RPO WITH THE INVENTION | | | | | |
| Average service time (ms) | 6.454 | 6.200 | 5.968 | 5.783 | 5.713 |
| I/O operations per second | 155.0 | 161.3 | 167.5 | 172.9 | 175.0 |

While a preferred embodiment of the invention has been described, it should be apparent that modifications and adaptations to this embodiment may occur to persons skilled in the art without departing from the scope and the spirit of the present invention as set forth in the following claims.

What is claimed is:

1. A method for handling missed revolutions in a disk system having a rotational disk for storing data, a read/write head for reading data from and writing data to the disk, and a queue of commands for accessing the data, the method comprising the steps of:

selecting a primary command from the queue using a Rotational Positioning Optimization (RPO) while a current command is being executed by the system, the optimization being based on a profile of estimated seek times for the commands in the queue;

selecting a secondary command from the queue using the optimization;

executing the primary command after the current command is completed;

if a missed revolution occurs during the execution of the primary command, then aborting the execution of the primary command and executing the secondary command; and repeating the method steps until all the commands in the queue are executed.

2. The method as recited in claim 1, wherein the secondary command is selected during the execution of the primary command.

3. The method as recited in claim 1, wherein the step of aborting includes returning the aborted primary command to the command queue to be selected again.

4. The method as recited in claim 1, wherein each of the commands corresponds to a starting position and an ending position of the head relative to the disk; and the Rotational Positioning Optimization (RPO) includes, for each command in the queue, an estimated total time for the head to be repositioned from a reference position, relative to the disk, to the starting position of the command.

5. The method as recited in claim 4, wherein the ending position of the current command is used as the reference position; and the primary command is a command in the queue with the shortest estimated total time.

6. The method as recited in claim 4, wherein:

the data on the disk is organized as a plurality of sectors;

the reference position is the starting position of the primary command plus M sectors, where M is a predetermined factor for the disk system; and the secondary command is a command in the queue with the shortest estimated total time.

7. The method as recited in claim 4, wherein:

the data on the disk is organized as a plurality of concentric cylinders; and the estimated total time for each command includes a seek time and a rotational latency time, the seek time being time it takes for the head to move from a current cylinder to the cylinder having the starting position of the command, and the latency time being time between the end of the seek time and when the starting position of the command is at the head.

8. The method as recited in claim 4, wherein the total time is estimated only for each of the first N commands in the queue, rather than for every command in the queue, N being a predetermined factor for the disk system.

9. The method as recited in claim 1, wherein the execution of the primary command is not aborted if the estimated seek time of the secondary command is longer than the rotational latency time of the primary command.

10. A method as recited in claim 1, wherein the selection of the second command is based on a generally conservative estimate of seek time for the secondary command.

11. A disk controller for use in a disk storage system having a rotational disk for storing data, a read/write head for writing data to and reading data from the disk, a queue of commands for accessing the data, the controller capable of handling missed revolutions in the disk system and comprising:

means for selecting a primary command from the queue using a Rotational Positioning Optimization (RPO) while a current command is being executed by the system, the optimization being based on a profile of estimated seek times for the commands in the queue;

means for selecting a secondary command from the queue using the optimization;

means for executing the primary command after the current command is completed; and means for aborting the execution of the primary command and executing the secondary command when a missed revolution occurs during the execution of the primary command.

12. The controller as recited in claim 11, wherein the secondary command is selected during the execution of the primary command.

13. The controller as recited in claim 11, wherein the means for aborting includes means for returning the aborted primary command to the command queue to be selected again.

14. The controller as recited in claim 11, wherein each of the commands corresponds to a starting position and an ending position of the head relative to the disk; and the Rotational Positioning Optimization (RPO) includes, for each command in the queue, an estimated total time for the head to be repositioned from a reference position, relative to the disk, to the starting position of the command.

15. The controller as recited in claim 14, wherein the ending position of the current command is used as the reference position; and the primary command is a command in the queue with the shortest estimated total time.

16. The controller as recited in claim 14, wherein:

the data on the disk is organized as a plurality of sectors;

the reference position is the starting position of the primary command plus M sectors, where M is a predetermined factor for the disk system; and the secondary command is a command in the queue with the shortest estimated total time.

17. The controller as recited in claim 14, wherein:

the data on the disk is organized as a plurality of concentric cylinders; and the estimated total time for each command includes a seek time and a rotational latency time, the seek time being time it takes for the head to move from a current cylinder to the cylinder having the starting position of the command, and the latency time being time between the end of the seek time and when the starting position of the command is at the head.

18. The controller as recited in claim 14, wherein the total time is estimated only for each of the first N commands in the queue, rather than for every command in the queue, N being a predetermined factor for the disk system.

19. The controller as recited in claim 11, wherein the execution of the primary command is not aborted if the estimated seek time of the secondary command is longer than the rotational latency of the primary command.

20. The controller as recited in claim 11, wherein the selection of the second command is based on a generally conservative estimate of seek time for the secondary command.

* * * * *